(12) United States Patent
Kobayashi et al.

(10) Patent No.: US 7,779,288 B2
(45) Date of Patent: Aug. 17, 2010

(54) HIGH RESOLUTION TIMER CIRCUIT AND TIME COUNT METHOD FOR SUPPRESSING INCREASE IN STORAGE CAPACITY

(75) Inventors: Hidenori Kobayashi, Sunto-gun (JP); Shunichi Ono, Izu (JP); Kazumasa Takada, Numazu (JP); Takashi Okano, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 706 days.

(21) Appl. No.: 11/687,704

(22) Filed: Mar. 19, 2007

(65) Prior Publication Data

US 2008/0231224 A1    Sep. 25, 2008

(51) Int. Cl.
  *G06F 1/04*    (2006.01)
(52) U.S. Cl. ........................... 713/502; 318/696
(58) Field of Classification Search .............. 713/500, 713/600, 502; 318/696
  See application file for complete search history.

(56) References Cited

U.S. PATENT DOCUMENTS

| 5,454,065 | A | * | 9/1995 | Toyomura | ................ | 358/1.5 |
| 5,583,410 | A | * | 12/1996 | Jacobson et al. | ............. | 318/696 |
| 6,848,061 | B2 | * | 1/2005 | Kawase | ....................... | 713/600 |
| 6,915,357 | B2 | * | 7/2005 | Kawase | ....................... | 710/25 |
| 6,975,053 | B2 | * | 12/2005 | Tsujimoto | ................... | 310/103 |
| 6,979,973 | B2 | * | 12/2005 | Yoo | ........................... | 318/696 |
| 7,304,449 | B2 | * | 12/2007 | Yoshihisa | ................... | 318/685 |
| 7,330,009 | B2 | * | 2/2008 | Andoh et al. | .............. | 318/696 |
| 2007/0273321 | A1 | | 11/2007 | Kobayashi et al. | | |

FOREIGN PATENT DOCUMENTS

| JP | 10-063357 | 3/1998 |
| JP | 11-136985 | 5/1999 |
| JP | 2000-014195 | 1/2000 |

* cited by examiner

*Primary Examiner*—Chun Cao
(74) *Attorney, Agent, or Firm*—Turocy & Watson, LLP

(57) ABSTRACT

A timer circuit includes a storage unit to store a series of first data content relating to a time into a specified address area, a target value generation unit to read the first data content from a read address of the storage unit and to generate, as a target value, third data content in which second data content is added to the first data content, a counter to perform counting and to output a count-up signal when the counting is performed up to the target value, and a control unit to sequentially designate a next read address of the storage unit at each count-up and to cause the series of operations of the target value generation unit and the counter to be executed.

4 Claims, 8 Drawing Sheets

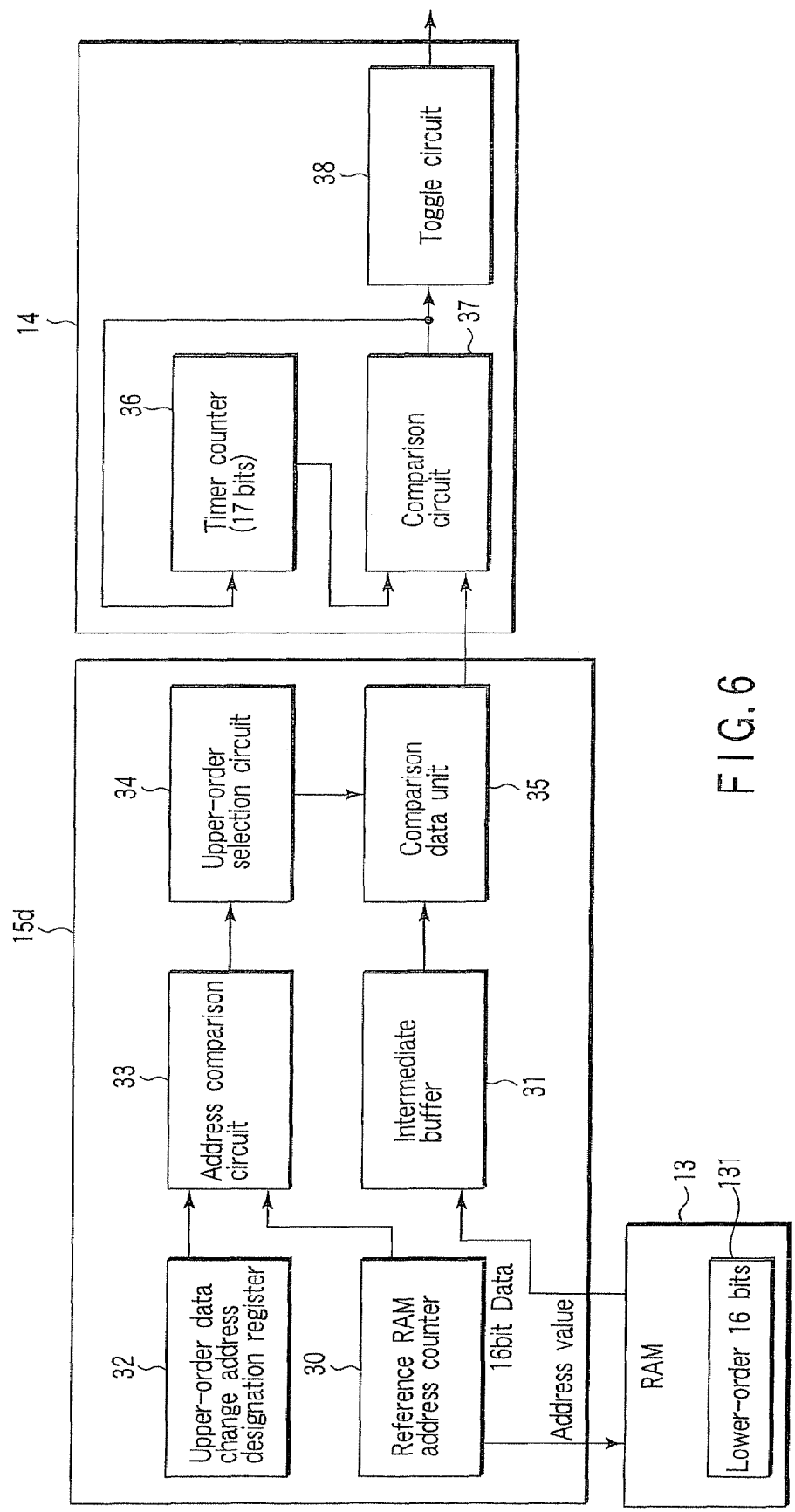
F I G. 6

HIGH RESOLUTION TIMER CIRCUIT AND TIME COUNT METHOD FOR SUPPRESSING INCREASE IN STORAGE CAPACITY

BACKGROUND OF THE INVENTION

1. Field of the Invention

The present invention relates to a timer circuit used for a motor drive control apparatus or the like and a time count method.

2. Description of the Related Art

Hitherto, in an image forming apparatus such as an MFP (MULTI FUNCTION PERIPHERAL), a copying machine or a printer, a stepping motor is used in order to control the rotation of a photoconductive drum or a transfer belt. The stepping motor is a motor to supply a specified exciting pattern to a driver and to perform driving, can perform a rotation control by a step angle corresponding to the supplied exciting pattern, and is used in a wide field.

A control device of the stepping motor includes a timer, generates a clock signal based on a reference timing signal generated by the timer, and creates the exciting pattern by using this clock signal. Accordingly, the rotation speed can be controlled by arbitrarily setting the period of the timing signal from the timer.

There are needs for further improvement in performance and for speedup in the image forming apparatus. In order to address the needs, the speedup of the stepping motor control is indispensable, and therefore, the timer is required to achieve higher resolution and to have more bits.

In general, in order to increase the resolution of the timer, it is possible to take measures of raising the clock frequency as the reference. At this time, unless the number of bits of the timer is increased, the countable maximum time becomes small, and therefore, in the motor control in which acceleration and declaration are gradually made to a specified speed, the count number of the timer is insufficient.

In a technique disclosed in JP-A-10-63357, two timers each having a small number of bits are used to realize the control equivalent to the case were one timer having a large number of bits is used, and further, the PWM period is made long to realize the control in which the resolution can be made fine.

BRIEF SUMMARY OF THE INVENTION

According to a first aspect of the invention, a timer circuit includes a storage unit configured to store a series of first data content relating to a time into a specified address area, a target value generation unit configured to read the first data content from a read address of the storage unit and to generate, as a target value, third data content in which second data content is added to the first data content, a counter to perform counting and to output a count-up signal when the counting is performed up to the target value, and a control unit configured to sequentially designate a next read address of the storage unit at each count-up and to cause the series of operations of the target value generation unit and the counter to be executed.

According to a second aspect of the invention, a time count method of a timer circuit includes the steps of storing a series of first data content relating to a time into a specified address area of the storage unit, reading the first data content from a read address of the storage unit and generating, as a target value, third data content in which second data content is added to the first data content, performing a count and outputting a count-up signal when the counting is performed up to the target value, and sequentially designating a next read address of the storage unit at each count-up and causing the series of operations at the step of generating the target value and the step of performing the count to be executed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a block diagram showing a structure of a timer circuit of the first embodiment.

DETAILED DESCRIPTION OF THE INVENTION

Hereinafter, embodiments of the invention will be described with reference to the drawings.

Figure 1:
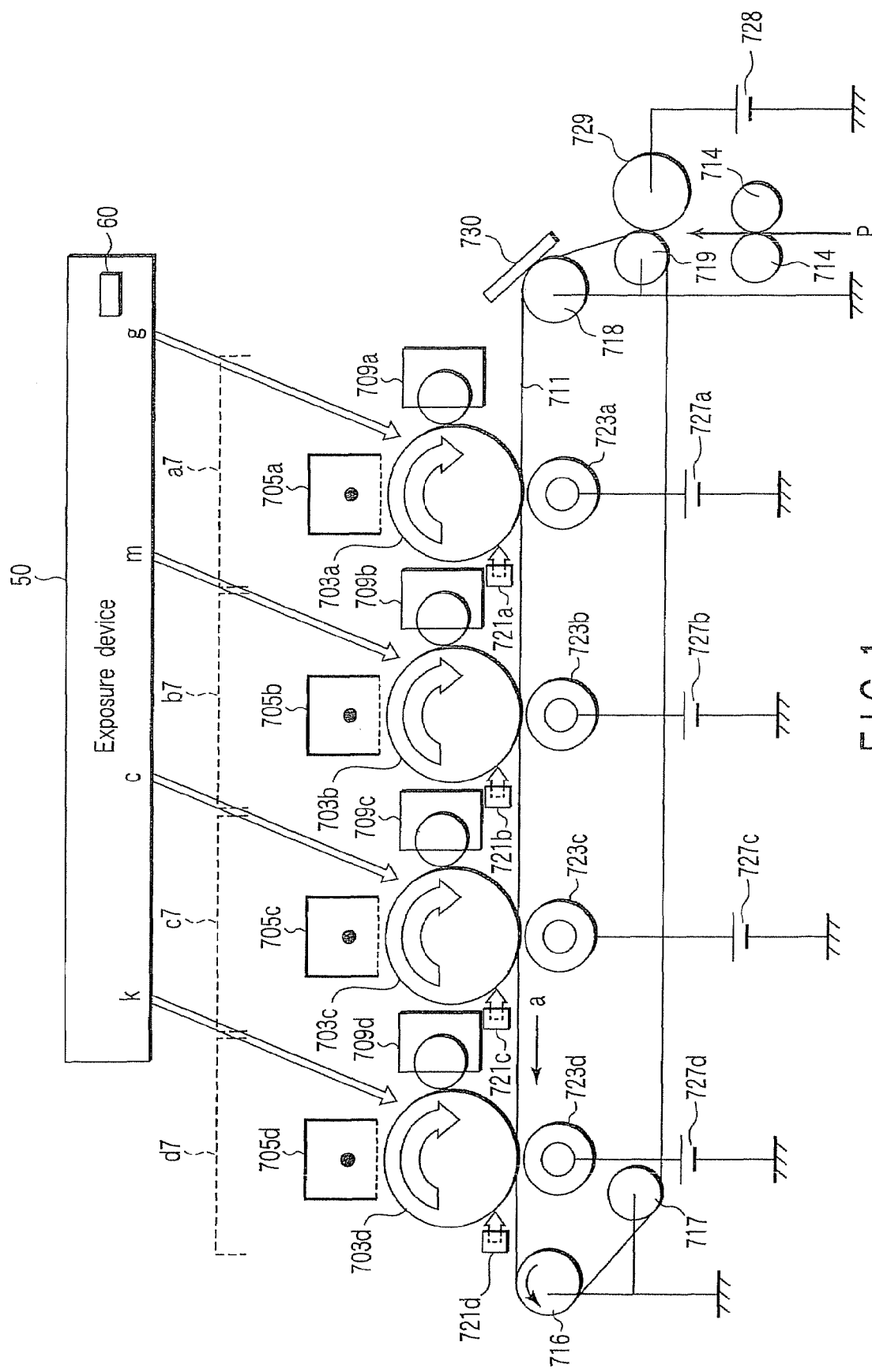
FIG. 1 is a view showing a structure of an image forming apparatus in which a timer circuit of a first embodiment is used.

FIG. 1 is a view showing a structure of an image forming apparatus in which a timer circuit of a first embodiment of the invention is used. Incidentally, in the following description, although the description will be given to an example in which the timer circuit is applied to the image forming apparatus such as an MFP, a printer or a copying machine, it can also be applied to another equipment.

A continuous printing operation of a color image will be described with reference to the four-tandem type image forming apparatus shown in FIG. 1.

Photoconductive drums 703a, . . . , 703d are OPC (Organic Photo receptor), and are provided to be rotatable in illustrated arrow directions. A transfer belt 711 is wound and stretched between a drive roller 716 rotated in an arrow direction by a not-shown motor and driven rollers 717, 718 and 719 spaced from the drive roller 716 by specified distances, and is traveled in an endless way at a constant speed in an arrow "a" direction.

An image formation process will be described by using an image forming unit a7.

First, a scorotron charging unit 705a uniformly negatively (−) charges the photoconductive drum 703a. The charged photoconductive drum 703a is exposed to light corresponding to image information by an exposure device 50, so that an electrostatic latent image is formed.

A two-component developing unit 709a containing yellow developer (toner) is disposed at the downstream side of the exposure by the exposure device 50. The electrostatic latent image on the photoconductive drum 703a is inversion-developed with the yellow toner and a toner image is formed on the photoconductive drum 703a.

A transfer roller 723a is disposed at the downstream side of the developing unit 709a. A bias (+) of a polarity reverse to the charging property of the toner is applied to the transfer roller 723a by a DC power source 727a. As a result, the toner image on the photoconductive drum 703a is primarily transferred onto the transfer belt 711 by a transfer electric field formed between the photoconductive drum 703a and the transfer roller 723a.

Next, the photoconductive drum 703a is diselectrified by an electricity removing device 721a, and then again repeats the process of charging→exposure→development.

In synchronization with the timing when the toner image is formed in the image forming unit a7, the same process is performed also in image formation units b7, c7 and d7. Toner images of magenta, cyan and black formed on the photoconductive drums 703b, . . . , 703d of the image formation units b7, . . . , d7 are also sequentially primarily transferred onto the transfer belt 711.

A sheet P as a transfer member is transferred from a not-shown sheet cassette, and is sent to the transfer belt 711 by an aligning roller 714 in timing with the toner image on the transferred belt 711.

A transfer roller 729a is disposed at the right end of the transfer belt 711 in the drawing. A bias (+) of a polarity reverse to the charging polarity of the toner is applied to the transfer roller 729a by a DC power source 728a. As a result, the toner image on the transfer belt 711 is transferred onto the sheet P by a transfer electric field formed between the transfer belt 711 and the transfer roller 729a.

At this time, partial toner (residual transfer toner) not completely transferred to the sheet P but remaining on the transfer belt 711 is cleaned by a cleaner 730.

At the downstream side (the upper part in the drawing) of the transfer belt 711, a not-shown fixing unit to fix the toner on the sheet P is disposed. A fixed image is obtained by causing the sheet P to pass through the fixing unit.

The exposure device 50 to form color-decomposed electrostatic latent images on the outer peripheral surfaces of the respective photoconductive drums 703a, 703b, 703c and 703d includes a semiconductor laser oscillator 60 emission-controlled based on image data (y, m, C, k) of the respective colors color-decomposed by a not-shown image processing apparatus.

A stepping motor is used for rotation driving of the photoconductive drums 703a, . . . , 703d used for the image formation processing and for rotation driving of the aligning roller 714 used for the sheet transport, the transfer roller 729 and the like. Especially in the case where a color image is formed, since the sheet passes through the four image formation units of black, cyan, magenta and yellow, the transport and positioning of the sheet is important, and the stepping motor is suitable for performing an accurate image formation processing.

Besides, in the image forming apparatus of the transfer belt system, there is also a case where a stepping motor is used for driving the transfer belt. In the case where there are a plurality of stepping motors to be controlled, a plurality of control devices are provided. In the case where the plurality of stepping motor control devices are provided, the timer is provided for each of them.

Figure 2:
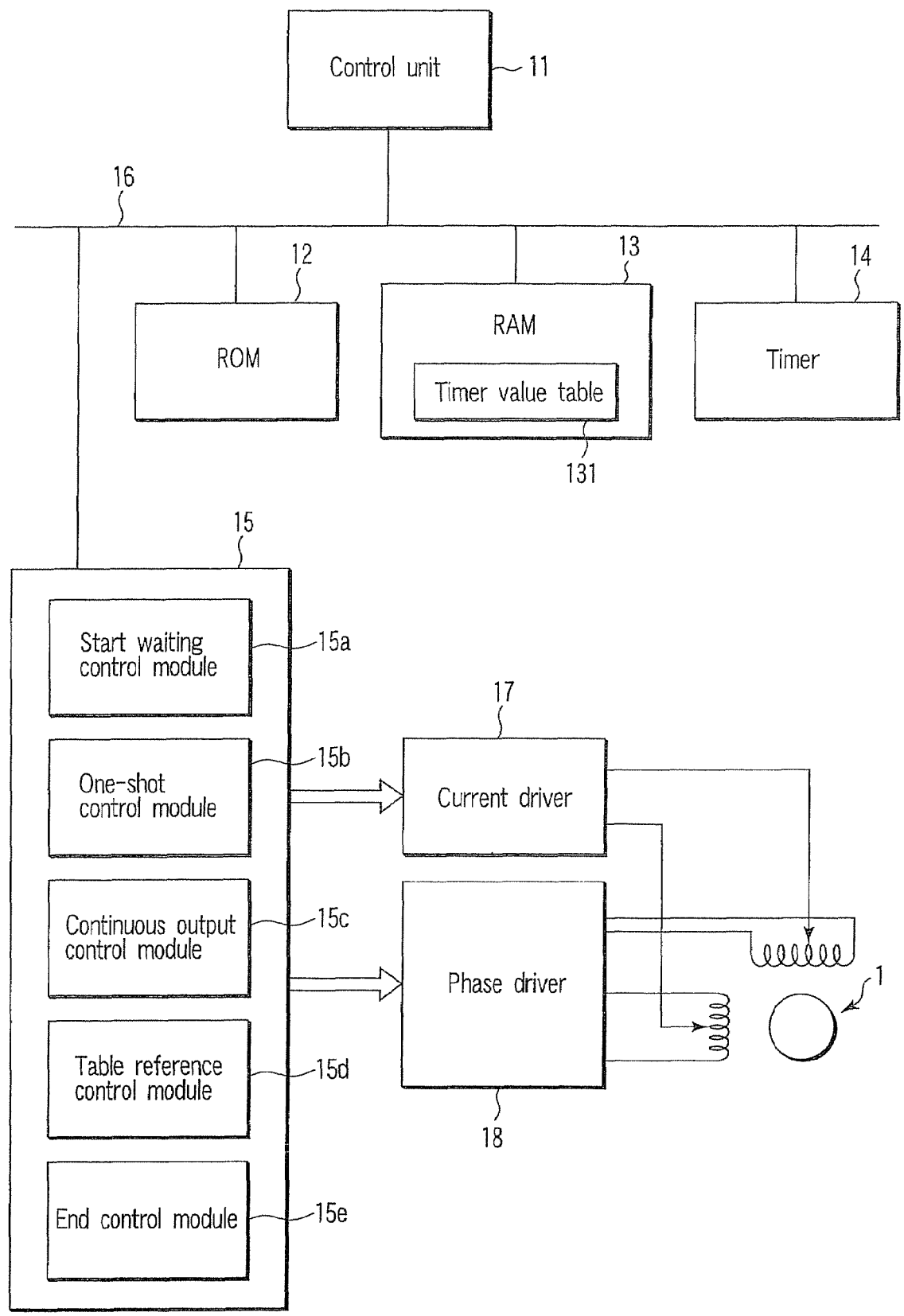
FIG. 2 is a view showing a structure of a control system of the image forming apparatus.

FIG. 2 is a view showing a structure of a control system of the image forming apparatus. The control system includes a control unit 11, a ROM (Read Only Memory) 12, a RAM (Random Access Memory) 13, a timer 14, an output port 15, a current driver 17, a phase driver 18 and a stepping motor 1. The control unit 11, the ROM 12, the RAM 13, the timer 14 and the output port 15 are electrically connected to one another through a bus line 16.

The control unit 11 controls the operation of the image forming apparatus overall. The control unit 11 can be constructed of a CPU (Central Processing Unit) or a sequencer. The ROM 12 stores program data and the like used by the control unit 11 to control the respective units. The RAM 13 is provided with a timer value table 131, together with various memories and tables for data processing. Based on the timer value table 131, the control unit 11 operates the timer 14 and controls the operation of the stepping motor 1.

The output port 15 includes various modules to control the stepping motor 1. The current driver 17 controls the amount of current flowing through a stator winding of the stepping motor 1 in accordance with a signal from the output port 15. The phase driver 18 changes and controls the phase of the stator winding in accordance with a signal from the output port 15.

The output port 15 is provided with a start waiting control module 15a, a one-shot control module 15b, a continuous output control module 15c, a table reference control module 15d and an end (off) control module 15e. Control from the start to the stop of the stepping motor is classified into a plurality of basic control items, and these modules execute processings relating to the respective items. The details will be described later.

Figure 3:
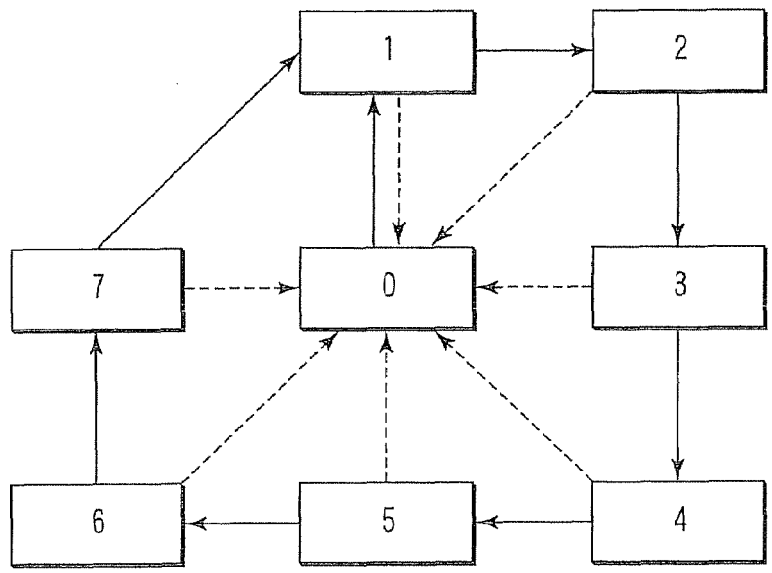
FIG. 3 is a view for schematically explaining an operation procedure of a stepping motor control of the image forming apparatus.

FIG. 3 is a view for schematically explaining the operation procedure of the stepping motor control of the image forming apparatus. As shown in FIG. 3, the control unit 11 produces a ring sequence of a plurality of sequences, for example, from a sequence 0 to a sequence 7, assigns the processing of each of the control modules 15a, . . . , 15e to each of the sequences, and effects a transition so that the processing is executed in a previously set order.

The control unit 11 starts from the sequence 0 of the start point, effects a transition in the order of the sequence 1, sequence 2, sequence 3, . . . , sequence 7 and sequence 1 and executes the processing. In the case where sequence disable setting is performed in the middle of the processing, or in the case where the end control module is declared during the sequence and the sequence changes to the state where the end control module is executed, the control unit 11 ends the processing at the stage, that is, stops the rotation of the motor, and returns the sequence to the sequence 0. when sequence enable setting is performed, the control unit 11 again starts the sequence from the sequence 0. For example, the start waiting control module 15a is set in the sequence 0 of FIG. 3, and one of the modules 15a, . . . , 15e to execute the hardware processing is arbitrarily set in the sequence 1, . . . , 7.

As described before, the control of the stepping motor can be classified into 1) start waiting control, 2) one-shot control, 3) table reference control, 4) continuous output control, and 5) end control. The plurality of modules 15a, . . . , 15e execute the five hardware processings in the order set by the control unit 11, and the motor control with a high degree of freedom becomes possible. Here, the processing functions of the respective modules 15a, . . . , 15e will be described.

The start waiting control module 15a is the module to change the sequence to a next one at the time point when a start factor occurs. At the time of the stepping motor control, it is used in an off state or in a normally holding state, and in this embodiment, it is fixed to the sequence 0. In a standby state, when a selected start factor satisfies a condition, a transition is effected to a next sequence, that is, the sequence 1 in this embodiment.

The one-shot control module 15b is the module to effect a transition to a next sequence after counting is performed for a specified time, and after the set count value is counted, the processing is stopped and shifts to a next sequence. In addition to the time count value to be counted, a motor holding current value and the like during the control execution are stored in a not-shown register. At the time of the control of the stepping motor, when pre-hold or post-hold control is performed, this one-shot control module 15b is used.

That is, since the phase state of the motor is not clear immediately after the power is turned on, a specified signal is outputted and is held for a fixed time, so that the stepping motor 1 can reach the start position of driving. This period is the pre-hold period. Besides, since the motor rotates by inertia at the time of motor stop, a specified period until a minute vibration disappears is set. This period is the post-holding period. When this one-shot control module 15b is used, the phase change can be selected at the time of processing execution start/stop.

The continuous output control module 15c is the module to change the output at every set time. This continuous output control module 15c generates a count-up signal at every set time count value, and when the execution end condition is satisfied, the module is stopped and shifts to a next sequence. At the time of the stepping motor control, it is used as the constant speed drive module.

The table reference control module 15d reads data from the timer value table 131 of the RAM 13, uses it as the count value and performs counting in cooperation with the timer 14. After the end of the counting, the count-up signal is outputted, data of a next address is read, and the counting is similarly performed. The table reference control module 15d repeats this operation for the respective set address areas, ends the processing, and shifts to a next sequence. At the time of the stepping motor control, it is used for the slow-up or slow-down control.

At the time of the slow-up, the timer period is shortened at every step to raise the rotation number gradually, and when the number of steps reaches a specified number, a shift is made to a constant speed processing as a next sequence. On the other hand, at the time of slow-down, the timer period is lengthened at every step to reduce the rotation number gradually, and when the number of steps reaches a specified number, a shift is made to a stop processing as a next sequence. When the motor is stopped, when it is abruptly stopped, the phase state is disturbed and a trouble such as a loss of synchronization can occur, and therefore, the slow-down control is performed.

The end control module 15e is the module to forcibly effect a transition to the sequence 0. The end control module 15e returns the sequence to the sequence 0 and shifts the sequence to the start waiting sequence.

Figure 4:
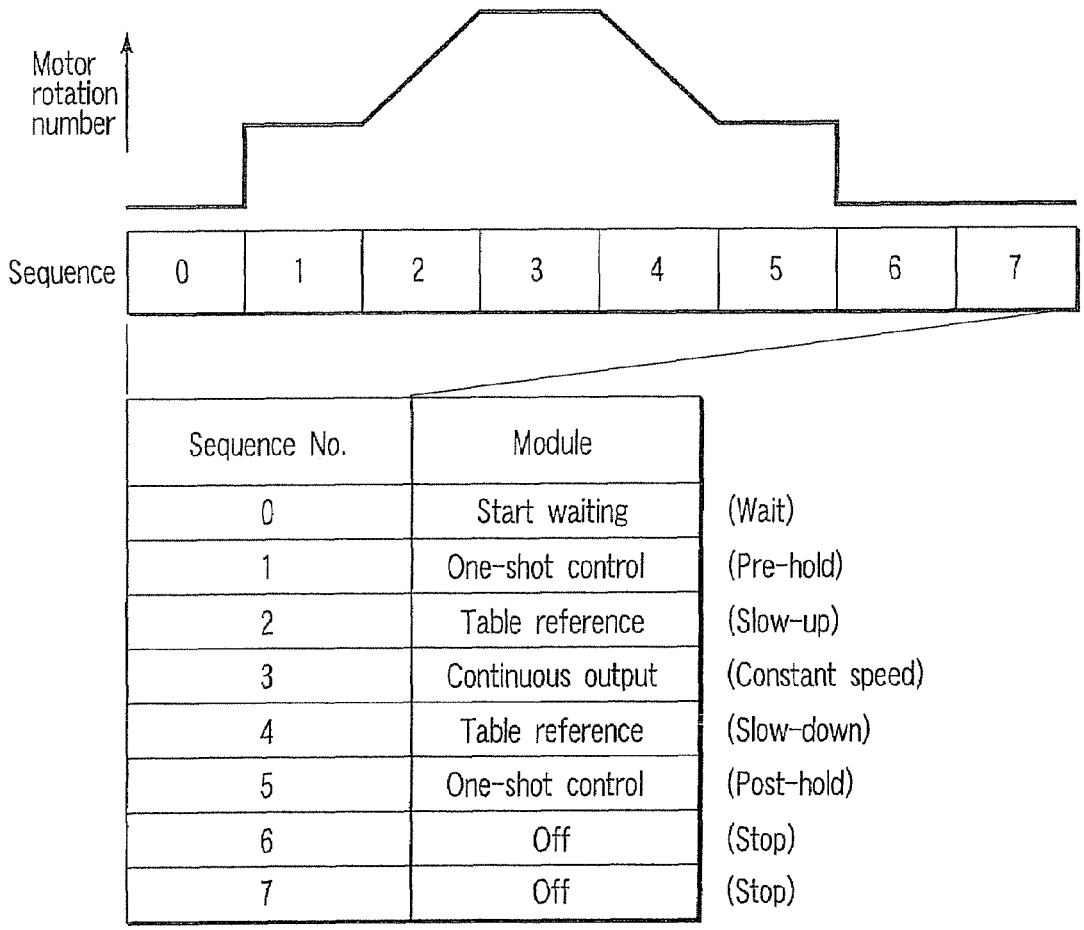
FIG. 4 is a view for explaining a setting example of a ring sequence by a control unit.

FIG. 4 is a view for explaining a setting example of the ring sequence by the control unit 11, and shows a case where the basic acceleration and declaration control of the stepping motor is performed. In FIG. 4, one of the modules 15a, . . . , 15e is set in the sequence 0, . . . , 7, and the processings in the modules 15a, . . . , 15e are sequentially executed.

This example shows the control procedure from the start of the motor to the acceleration, constant speed, declaration, and stop. The start waiting control module 15a is set in the sequence 0, and the stepping motor 1 is in the wait state. The one-shot control module 15b is set in the next sequence 1, and the stepping motor 1 is brought into the state of the pre-hold period. The table reference control module 15d is set in the sequence 2, and the stepping motor 1 is slow-up controlled and is brought into the state in which the rotation speed is gradually increased.

Further, the continuous output control module 15c is set in the sequence 3, and the stepping motor 1 is brought into the state of the constant rotation control. The table reference control module 15d is set in the sequence 4, and the stepping motor 1 is slow-down controlled and is brought into the state in which the rotation speed is gradually reduced. The one-shot control module 15b is set in the sequence 5, and the stepping motor 1 is brought into the state of the post-holding period. The end control module 15e is set in the sequences 6 and 7, and the stepping motor 1 is stopped.

Next, the basic way of thinking of the timer circuit of the embodiment will be described.

Figure 5:
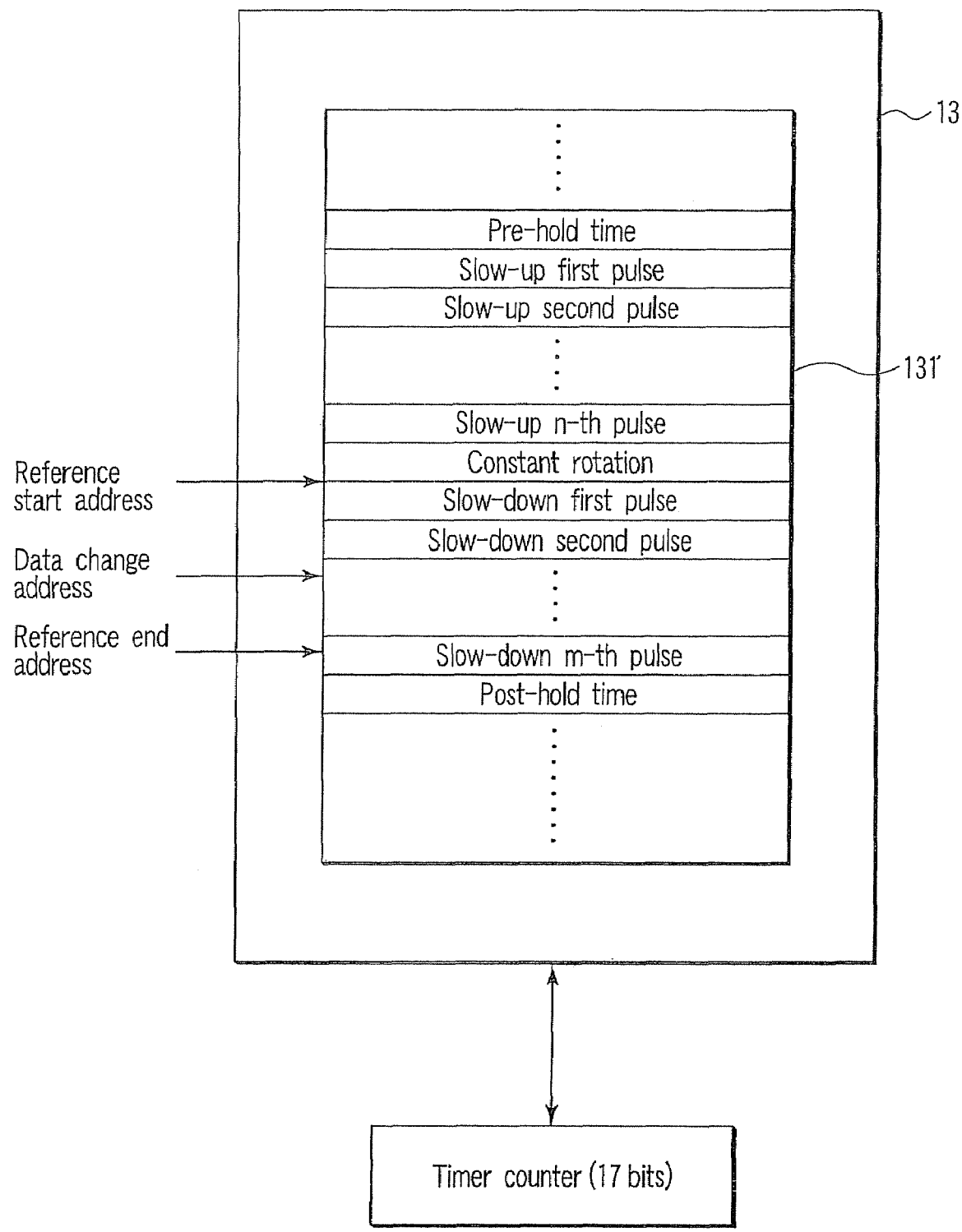
FIG. 5 is a view showing a timer value table provided in a RAM.

FIG. 5 is a view showing the timer value table 131 provided in the RAM 13. Time data sequentially set when the stepping motor 1 is controlled from the hold state to the pre-hold→slow-up driving→constant rotation→slow-down driving→post-hold→hold state are stored in the timer value table 131. When the stepping motor 1 is driven, the control unit 11 sequentially reads the time data from the timer value table 131 and sets it in the timer 14.

As described above, in the case where the number of bits of the timer 14 is increased in order to speed up the stepping motor control, it is necessary to pay attention to that the capacity of the RAM 13 is increased. For example, in the case where the number of bits is increased so that the timer 14 can handle a count of 16 bits or more, since the time data stored in the timer value table 131 also comes to have 16 bits or more, the capacity of the RAM 13 is remarkably increased. Besides, since the normal RAM 13 is often constructed in a unit of 8 bits, in the case where the maximum count value of the timer 14 has a fraction relative to multiples of 8, a wasteful portion exists in the RAM 13.

In this embodiment, this problem is solved as described below. For example, even in the case where the maximum count value of the timer 14 requires 17 bits, the RAM 13 has 16 bits. Then consideration will be given to the case where slow-down control of the stepping motor 1 is executed.

A reference start address and a reference end address are determined in the timer value table 131 for execution of the slow-down control. The control unit 11 sequentially reads the time data from the reference start address of the timer value table 131, and sets it in the timer 14. At this time, since the stepping motor 1 is declaration-controlled, the time data set in the timer is sequentially simply changed from a short time to a long time. At the initial stage, the time data can be counted in 16 bits. However, after a certain address, 17 bits are required in order to count the time data. The address requiring the bit change is previously known for each slow-down control. This address is called a data change address.

Then, the data of the lower-order 16 bits of the count value are stored in the RAM 13, and it is changed whether the upper-order one bit is made "0" or "1" according to the reference address of the RAM 13. By this, while the increase of the RAM capacity is suppressed, the timer circuit with high resolution can be constructed.

For example, in the case where the capacity of the timer value table 131 is 2K words, and the data change address is 3FFh, during the period when reference is made to address 000h, . . . , 3FFh, the most significant bit is made "0". In the case where reference is made to address 400h or higher, the most significant bit is made "1". By this, even in the case where the counter of 17 bits is used, the RAM capacity can be suppressed.

FIG. 6 is a block diagram showing a structure of the timer circuit of the first embodiment.

The timer circuit of this embodiment includes the table reference control module 15*d*, the timer value table 131 of the RAM 13 and the timer 14. The respective parts cooperate with each other under the control of the control unit 11 so that a desired timer operation is realized.

Hereinafter, the operation of the timer circuit will be described with reference to FIG. 6. Incidentally, the timer 14 has a resolution of 17 bits.

The control unit 11 specifies a desired timer operation in the sequence processing. That is, an address of the RAM 13 in which timer values are stored is set in a reference RAM address counter 30. Based on this address value, a timer value is extracted from the timer value table 131 and is temporarily stored in an intermediate buffer 31. Here, the extracted timer value has a length of 16 bits.

On the other hand, the data change address shown in FIG. 5 is stored in an upper-order data change address designation register 32. An address comparison circuit 33 compares magnitudes between the data change address and the RAM address to which reference is made. Based on the comparison result of the address comparison circuit 33, an upper-order data selection circuit 34 determines whether the value of the most significant bit (MSB) is made "0" or "1". Incidentally, although not clearly shown in the drawing, data to specify the correspondence between the address comparison result and the value of the most significant bit is inputted in the upper-order data selection circuit 34 through a not-shown register from the control unit 11. The upper-order data selection circuit 34 considers this data and determines the value of the upper-order bit.

Incidentally, this embodiment handles the case where the 17-bit counter is used and the number of bits of the fraction is 1. In the case where the number of bits of the fraction is 2 or higher, the number of upper-order data change address designation registers 32 is also increased according to the number of bits of the fraction, and further, registers to designate values to be given to the upper-order data selection circuit 34 between the respective data change addresses are individually provided, so that general versatility can be enhanced.

A comparison data unit 35 extracts the timer value stored in the intermediate buffer 31, adds the upper-order bit inputted from the upper-order data selection circuit 34, and generates a timer value of 17 bits.

A timer counter 36 has 17 bits and continues counting. The count value is outputted to a comparison circuit 37. When the count value outputted from the timer counter 36 becomes equal to the count value outputted from the comparison data unit 35, the comparison circuit 37 outputs a count-up signal. This signal causes a toggle circuit 38 to output a toggle signal, resets the count value of the timer counter 36 and causes a new timer count to be started.

Incidentally, in this embodiment, although the timer counter 36 integrates the timer value, the timer circuit may be constructed so as to decrease the timer count value. For example, the timer value of 17 bits generated by the comparison data unit 35 is treated as a set value, the set value is decreased in accordance with the passage of time, and a count-up signal may be outputted when the value becomes 0.

Incidentally, in this embodiment, as shown in FIG. 6, although the functions of the timer 14 and the table reference control module 15*d* are divided, no limitation is made to this example, and they may be divided at a suitable position.

Figure 7:
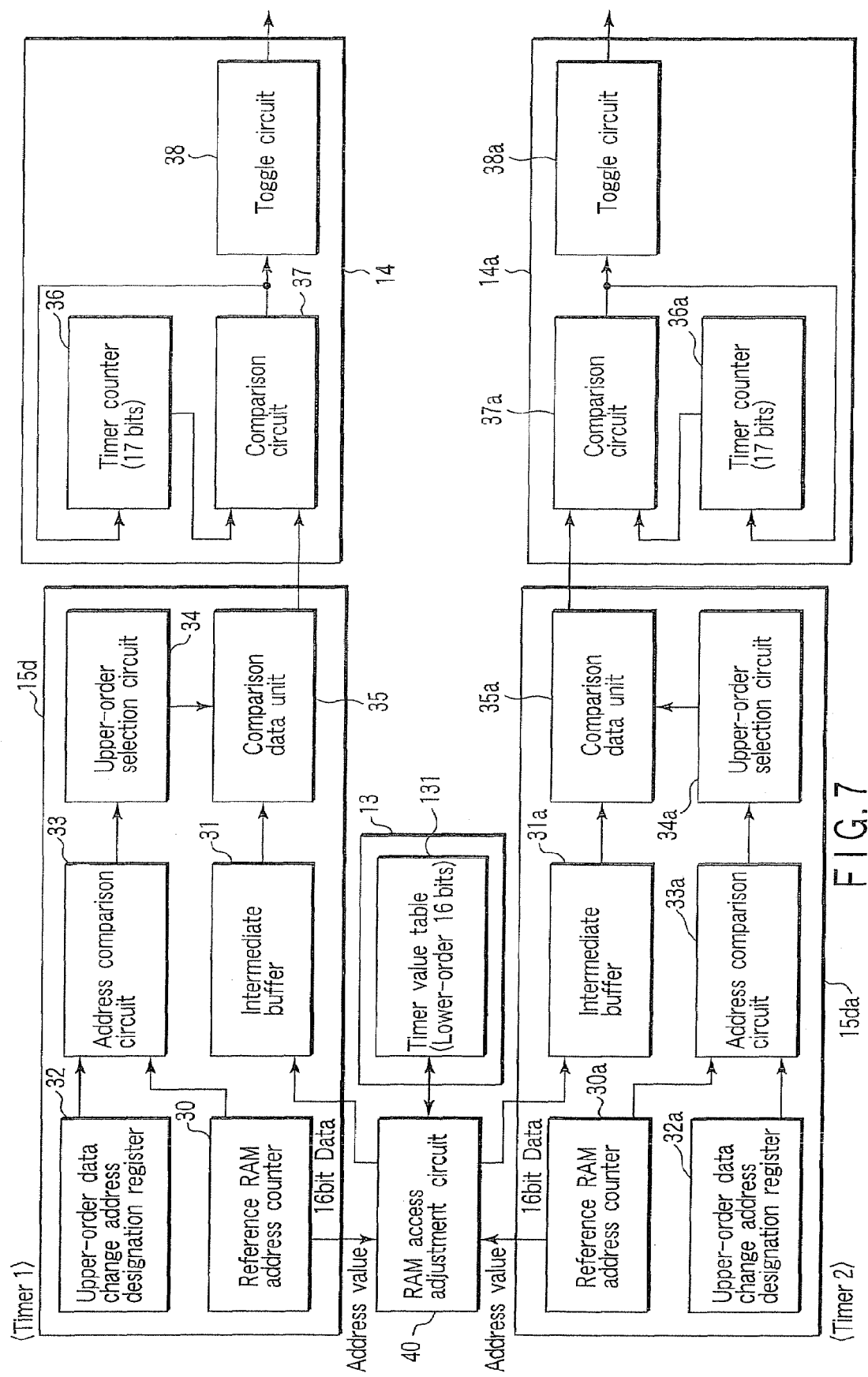
FIG. 7 is a block diagram showing a structure of a timer circuit of a variation of the first embodiment.

FIG. 7 is a block diagram showing a structure of a timer circuit of a variation of the first embodiment. The timer circuit of the variation has a structure dealing with the case where a plurality of timer circuits operate at random. That is, in addition to a circuit for a usual timer 1, a circuit for a timer 2 is provided. A RAM access adjustment circuit 40 to adjust access to a RAM 13 is newly provided. Incidentally, since a timer 14*a*, a table reference control module 15*da* constituting the circuit for the timer 2 have the same functions as a timer 14 and a table reference control module 15*d* provided in the timer 1, their detailed description will be omitted.

The RAM access adjustment circuit 40 performs, for example, a service to an access request from a plurality of timers to the RAM in a time sharing system. Accordingly, when the RAM access adjustment circuit 40 is used, even in the case where the plurality of timers are used, the timer circuit can be structured while avoiding the contention to the RAM 13.

Next, a timer circuit of a second embodiment of the invention will be described. Incidentally, portions having the same functions as those of the first embodiment are denoted by the same reference numerals and their detailed description will be omitted.

Figure 8:
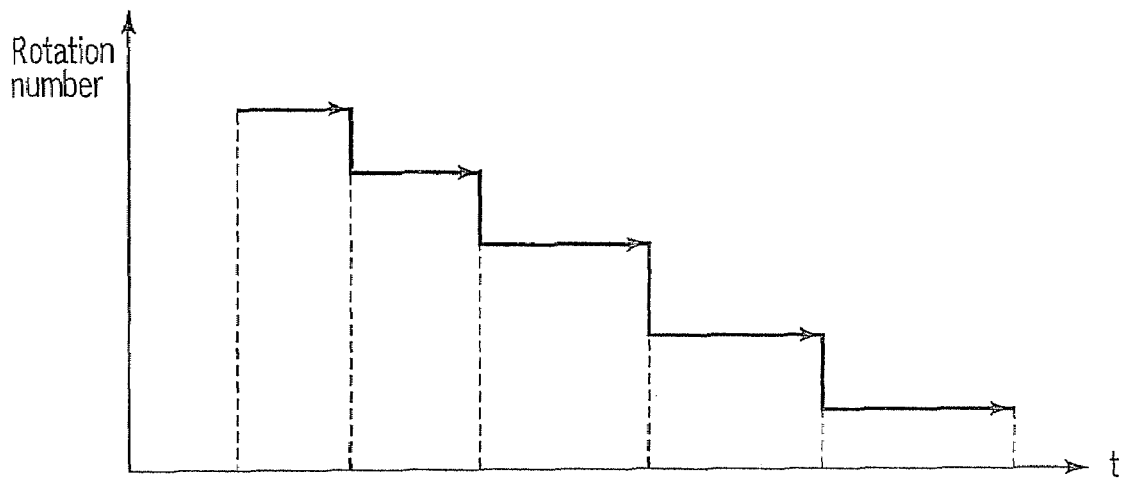
FIG. 8 is a view for explaining a basic way of thinking of a timer circuit of a second embodiment.

FIG. 8 is a view for explaining the basic way of thinking of the timer circuit of the second embodiment.

A timer count value used for slow-down or slow-up is generally simply changed. Accordingly, as shown in FIG. 8, the timer value at the time of slow-down expressed in four bit data is simply increased. However, in the lower-order three bit data, the value is decreased after the time point when a carry occurs in the most significant bit. On the contrary, the timer value at the time of slow-up expressed in four-bit data is simply decreased. However, in the lower-order three bit data, the value is increased after the time point when a borrow occurs in the most significant bit.

That is, at the time of slow-down or slow-up, even in the case where the upper-order bit is not provided, when the increase or decrease tendency of the read timer value is reversed, it is possible to determine that the carry or borrow occurs in the most significant bit at the time point.

Figure 9:
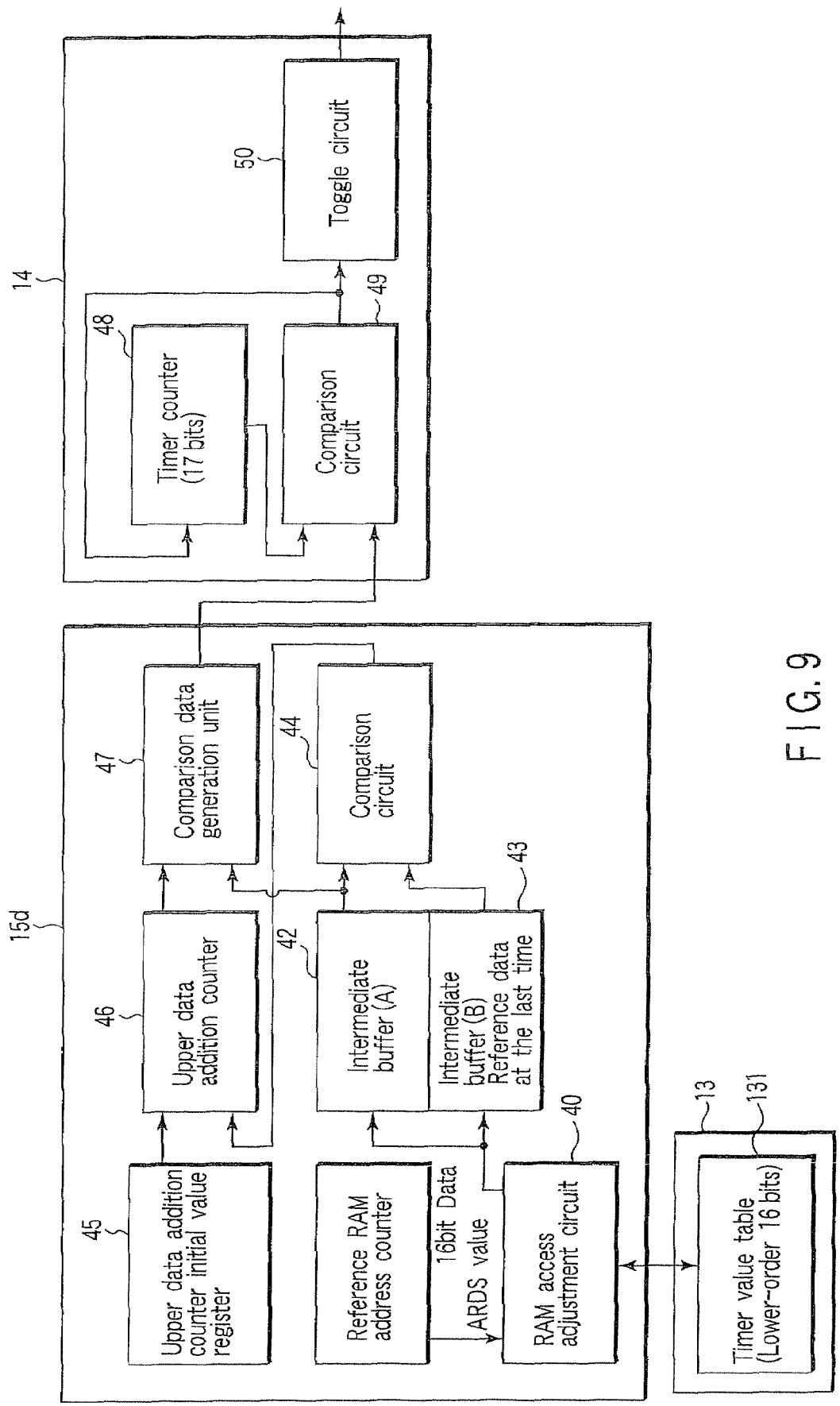
FIG. 9 is a block diagram showing a structure of the timer circuit of the second embodiment.

FIG. 9 is a block diagram showing a structure of the timer circuit of the second embodiment.

The timer circuit of this embodiment includes a table reference control module 15*d*, a timer value table 131 of a RAM 13, and a timer 14. The respective parts cooperate with each other under the control of a control unit 11, so that a desired timer operation is realized.

Hereinafter, the operation of the timer circuit will be described with reference to FIG. 9. Incidentally, the timer 14 has a resolution of 17 bits or higher.

The control unit 11 specifies the desired timer operation in sequence processing. That is, an address of the RAM 13 in which timer values are stored is set in a reference RAM address counter 41. A timer value is extracted from the timer value table 131 based on this address value, and is temporarily stored in an intermediate buffer 42. Here, the extracted timer value has a length of 16 bits. Incidentally, a timer value extracted at the last time is stored in an intermediate buffer 43. A comparison circuit 44 compares the timer value at the last time with the timer value at this time, and outputs a comparison result to an upper-order data addition counter 46.

On the other hand, initial values of upper-order data at the start time of slow-down and slow-up operations are set in an upper-order data addition counter initial value register 45. This initial value is set at, for example, the operation start time from the control unit 11. The upper-order data addition counter 46 increments or decrements the initial value according to the comparison result from the comparison circuit 44.

For example, in the case where the timer value which should generally have an increase tendency is decreased during the slow-down operation, 1 is added to the upper-order data addition counter. In the case where the timer value which should generally have a decrease tendency is increased during the slow-up operation, 1 is decreased from the upper-order data addition counter. The comparison data generation unit 47 adds the value of the upper-order data addition counter to the upper order of the timer value stored in the intermediate buffer 42, and generates comparison data.

A timer counter 48 has 17 bits or higher and continues counting. The count value is outputted to a comparison circuit 49. When the count value outputted from the timer counter 48 becomes equal to the count value outputted from the comparison data generation unit 47, the comparison circuit 49 outputs a time-up signal. This signal causes a toggle circuit 50 to output a toggle signal, resets the count value of the timer counter 48, and causes a new timer count to be started.

Incidentally, in this embodiment, although the timer count 48 integrates the timer value, the timer circuit may be constructed so that the timer count value is decreased. For example, a timer value of 17 bits or higher generated by the comparison data generation unit 47 is treated as a set value, the set value is decreased in accordance with the passage of time, and the count-up signal may be outputted when the value becomes 0.

Incidentally, in this embodiment, as shown in FIG. 9, although the functions of the timer 14 and the table reference control module 15*d* are divided, no limitation is made to this example, and they may be divided at a suitable position.

According to the embodiment as described above, with respect to the lower-order bit of the timer, reference is made to the RAM, and the upper-order bit becomes a value selected based on the value of the reference address counter of the RAM. Alternatively, with respect to the lower-order bit of the timer, reference is made to the RAM, and the upper-order bit becomes a value generated by an arithmetic operation result based on the reference value of the RAM. As described above, the timer is generated by combining two values, so that the RAM capacity can be suppressed. Accordingly, the timer with high resolution and low cost can be constructed.

Incidentally, even in the case where the timer circuit of this embodiment is used, flexible pulse motor drive control is possible.

Figure 10:
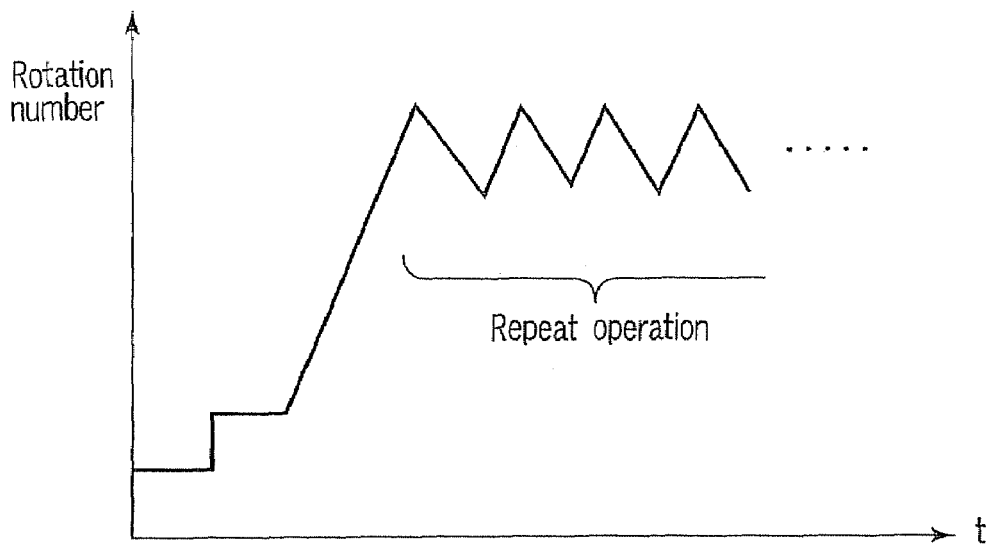
FIG. 10 is a view for explaining a setting example of a ring sequence by a control unit.

FIG. 10 is a view for explaining a setting example of a ring sequence by the control unit 11, and shows a case where acceleration and declaration control of repetition of the stepping motor is performed.

This example shows the control procedure in which the motor is started and is accelerated, and after a specified speed is attained, the acceleration and declaration are repeated. When the acceleration is performed from the stop time to the specified speed, the timer value of, for example, 17 bits is required. However, in the operation after the specified speed is attained, it is possible to sufficiently control the operation by the timer value of 16 bits.

The timer circuit of this embodiment can be applied also to the control operation as stated above. During the repeated control operation, the upper-order bit is a fixed value and is not changed. Accordingly, in the case where the timer circuit shown in FIG. 6 is used, for example, the value of the upper-order data change address designation register 32 is set so that the value of the upper-order data always becomes a specified value, and as a result, a desired operation can be realized. Incidentally, also in the case where this operation is controlled, the ring sequence shown in FIG. 3 can be applied.

Incidentally, the respective functions described in the foregoing embodiments may be structured by using hardware, or may be realized by using software and loading a program describing the respective functions into a computer. Besides, the respective functions may be structured by appropriately selecting one of the software and hardware.

Further, the respective functions can be realized by causing a computer to read a program stored in a not-shown recording medium. Here, in the recording medium in this embodiment, as long as the program can be recorded and can be read by the computer, any recording form may be adopted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A timer circuit comprising:
   a storage unit configured to store a series of first data content relating to a time into a specified address area;
   a target value generation unit configured to read the first data content from a read address of the storage unit and to generate, as a target value, third data content in which second data content is added to the first data content;
   a counter to perform counting and to output a count-up signal when the counting is performed up to the target value; and
   a control unit configured to sequentially designate a next read address of the storage unit at each count-up and to cause a series of operations of the target value generation unit and the counter to be executed,
   wherein the target value generation unit includes:
   a read unit configured to designate the read address of the storage unit and to read the first data content;
   a comparison unit configured to compare magnitudes between the first data content read at this time and the first data content read at the last time; and
   an operation unit configured to increase or decrease the second data content by a specified value when a relation of the magnitudes is reversed differently from a specified increase or decrease tendency.

2. The timer circuit according to claim 1, wherein the data content is a timer value for motor drive control.

3. A time count method of a timer circuit, comprising the steps of:
   storing a series of first data content relating to a time into a specified address area of the storage unit;
   reading the first data content from a read address of the storage unit and generating, as a target value, third data content in which second data content is added to the first data content;
   performing counting and outputting a count-up signal when the counting is performed up to the target value; and
   sequentially designating a next read address of the storage unit at each count-up and causing a series of operations of the step of generating the target value and the step of performing the counting to be executed,
   wherein the step of generating the target value includes the steps of:
   designating the read address of the storage unit and reading the first data content;
   comparing magnitudes between the first data content read at this time and the first data content read at the last time; and
   increasing or decreasing the second data content by a specified value when a relation of the magnitudes is reversed differently from a specified increase or decrease tendency.

4. The time count method according to claim 3, wherein the data content is a timer value for motor drive control.

* * * * *